United States Patent

Reynolds et al.

[11] Patent Number: 5,924,535
[45] Date of Patent: Jul. 20, 1999

[54] PIN-TYPE SYNCHRONIZER WITH SELF-ENERGIZING RAMP MEANS PROVIDING FORCE FOR MAINTAINING ENGAGEMENT OF JAW MEMBERS

[75] Inventors: Joseph D. Reynolds, Climax; Eugene R. Braun, Royal Oak, both of Mich.

[73] Assignee: Eaton Corporation, Cleveland, Ohio

[21] Appl. No.: 08/908,086

[22] Filed: Aug. 11, 1997

[51] Int. Cl.⁶ ................................................. F16D 23/06
[52] U.S. Cl. ............................... 192/53.331; 192/53.31; 192/53.332; 74/339
[58] Field of Search ..................... 192/53.331, 53.332, 192/53.31, 53.3, 53.33, 53.1; 74/339

[56] References Cited

U.S. PATENT DOCUMENTS

| | | | |
|---|---|---|---|
| 3,548,983 | 12/1970 | Hiraiwa | 192/53.341 |
| 3,695,403 | 10/1972 | Eastwood | 192/53.331 |
| 5,069,079 | 12/1991 | Vandervoort | 74/339 |
| 5,078,245 | 1/1992 | Nelluns et al. | 192/53.332 |
| 5,086,897 | 2/1992 | Reynolds | 192/53.331 |
| 5,161,423 | 11/1992 | Ore | 74/339 |
| 5,178,250 | 1/1993 | Ashikawa et al. | 74/339 X |
| 5,339,936 | 8/1994 | Lauer et al. | 192/53.332 |
| 5,558,194 | 9/1996 | Cox | 192/53.331 X |
| 5,713,447 | 2/1998 | Skotnicki et al. | 192/53.331 X |
| 5,865,287 | 2/1999 | Servoss | 192/53.31 |

FOREIGN PATENT DOCUMENTS

| | | | |
|---|---|---|---|
| 1098824 | 2/1959 | Germany . | |
| 0559054 | 5/1977 | U.S.S.R. | 74/339 |
| 2036208 | 6/1980 | United Kingdom | 74/339 |

*Primary Examiner*—Charles A. Marmor
*Assistant Examiner*—Ankur Parekh
*Attorney, Agent, or Firm*—Paul S. Rulon; Howard D. Gordon

[57] ABSTRACT

A pin-type, double-acting synchronizer mechanism (20) with friction members (30, 40 and 32, 42), jaw members (34, 50 and 36, 52), three circumferentially spaced pins (44) including blocker shoulders for preventing asynchronous engagement of the jaw clutches, and pre-energizer assemblies (48) to ensure initial engagement of the friction rings and blocker shoulders in response to initial engaging movement of a shift flange (46), and self-energizing ramps (24*d*, 24*e*, 26*d*, 26*e*) defined by posts (24*c*, 26*c*) projecting from a hub (22) and self-energizing ramps (54*b*, 54*c*, 54*d*, 54*e*) defined by a ring integrally formed with the flange and two of the jaw members. The self-energizing ramps remain engaged when the jaw clutches are engaged to assist keeping the jaw clutches engaged. A modified synchronizer 120 includes springs 155 to control/limit the additive force provided by the self-energizing ramps.

27 Claims, 4 Drawing Sheets

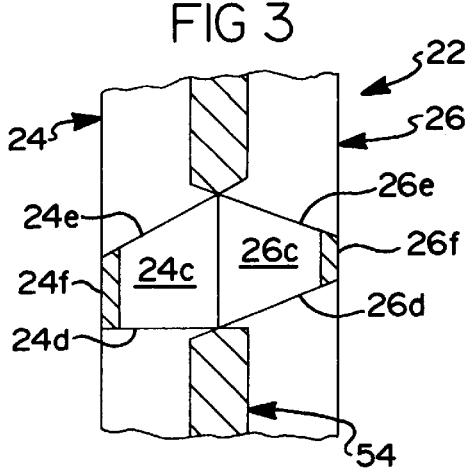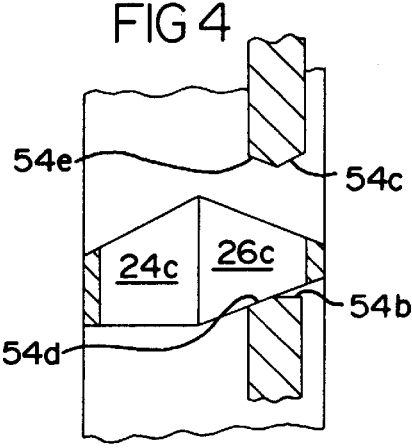

PIN-TYPE SYNCHRONIZER WITH SELF-ENERGIZING RAMP MEANS PROVIDING FORCE FOR MAINTAINING ENGAGEMENT OF JAW MEMBERS

CROSS-REFERENCE TO RELATED APPLICATIONS

This application, having attorney docket number 91-TRN-499, relates to U.S. application Ser. Nos. 08/908,091, 08/908,087, 08/908,092, 08/908,093, and 08/908.090, filed Aug. 11, 1997, and respectively having attorney docket numbers 95-rELT-217, 95-rTRN-406, 94-rELT-247, 94-rELT-154, and 97-rTRN-259, and all assigned to the assignee of this application.

FIELD OF THE INVENTION

This invention relates to improvements a pin-type synchronizer for a transmission.

BACKGROUND OF THE INVENTION

It is well known in the multiple speed ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size, synchronizer mechanisms of the self-energizing type are especially important for heavy duty trucks. However, such synchronizer mechanisms are not limited to truck use. Prior art examples of synchronizers that are relevant to the synchronizer herein may be seen by reference to U.S. Pat. Nos. 5,078,245 and 3,548,983, and German Patent Document 1,098,824 which are incorporated herein by reference.

SUMMARY OF THE INVENTION

An object of this invention is to provide a pin-type synchronizer with an improved jaw clutch member engagement.

Another object of this invention is to provide pin-type synchronizer with an improved self-energizing force limiting.

According to one feature the invention, a pin-type synchronizer, as disclosed in U.S. Pat. No. 5,078,245, includes a pin-type synchronizer selectively operative to frictionally synchronize and positive connect either of first and second drives to a shaft having an axis. The synchronizer includes first and second jaw members affixed respectively to the first and second drives and respectively engagable with axially movable third and fourth jaw members in response to an axial bidirectional shift force ($F_o$) moving a radially extending flange. First and second friction members are respectively secured for rotation with the first and second drives. Third and fourth friction members are concentric to the shaft and axially movable between the drives for frictional engagement respectively with the first and second friction members to provide a synchronizing torque for synchronizing the drives with the shaft. Blocker means are operative when engaged for preventing engagement of the jaw members prior to the synchronizing. The blocker means include a plurality of circumferentially spaced apart pins rigidly extending axially between the third and forth friction members and into a set of openings in the flange. Each of the pins has a blocker shoulder engagable with a blocker shoulder defined about the associated opening. Pluralities of first and second self-energizing ramps means are engagable in response to the synchronizing torque for producing an additive force ($F_a$) on the flange in the direction of the shift force ($F_o$) and for increasing total engaging force on the friction members. The first self-energizing ramp means are affixed against rotational movement relative to the flange and the second self-energizing ramp means are affixed against rotational and axial movement relative to the shaft.

The improvement comprises the first and second self-energizing ramp means being disposed radially inward of the third and fourth jaw members; and stop means to limit axial movement of the third and fourth jaw means during engagement respectively with the first and second jaw members and during engagement of the first and second self-energizing ramp means, whereby torque transmission between the shaft and the engaged jaw members is via the engaged self-energizing ramp means which provide a stay engaged force for maintaining engagement of the engaged jaw members.

BRIEF DESCRIPTION OF THE DRAWINGS

The self-energizing synchronizer mechanism of the invention is shown in the accompanying drawings in which:

FIG. 3 is a partial and somewhat enlarged view of the synchronizer in section and looking along line 3—3 in FIG. 2;

FIG. 4 illustrates an engaged position of self-energizing ramps in FIG. 3;

FIG. 5 is a graphical representation of axial forces and torques acting on a shift flange of the synchronizer;

FIG. 6 is a partial view in section of a modified embodiment of the double-acting synchronizer mechanism in FIG. 1 looking along line 6—6 in FIG. 7;

DETAILED DESCRIPTION OF THE DRAWINGS

Figure 1:
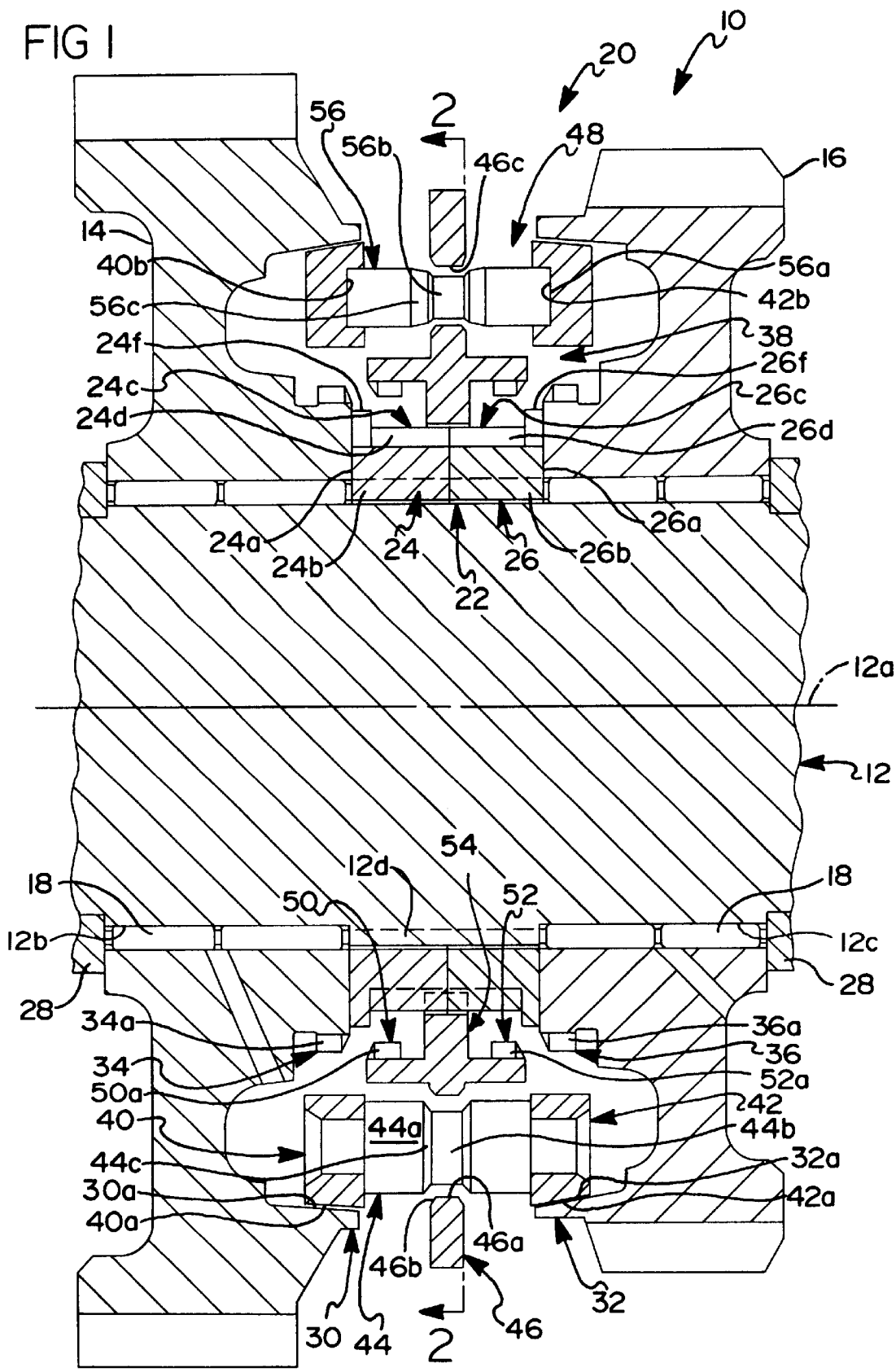
FIG. 1 is a sectional view of a somewhat schematically illustrated double-acting synchronizer mechanism in a neutral position and looking along line 1—1 in FIG. 2.
Figure 2:
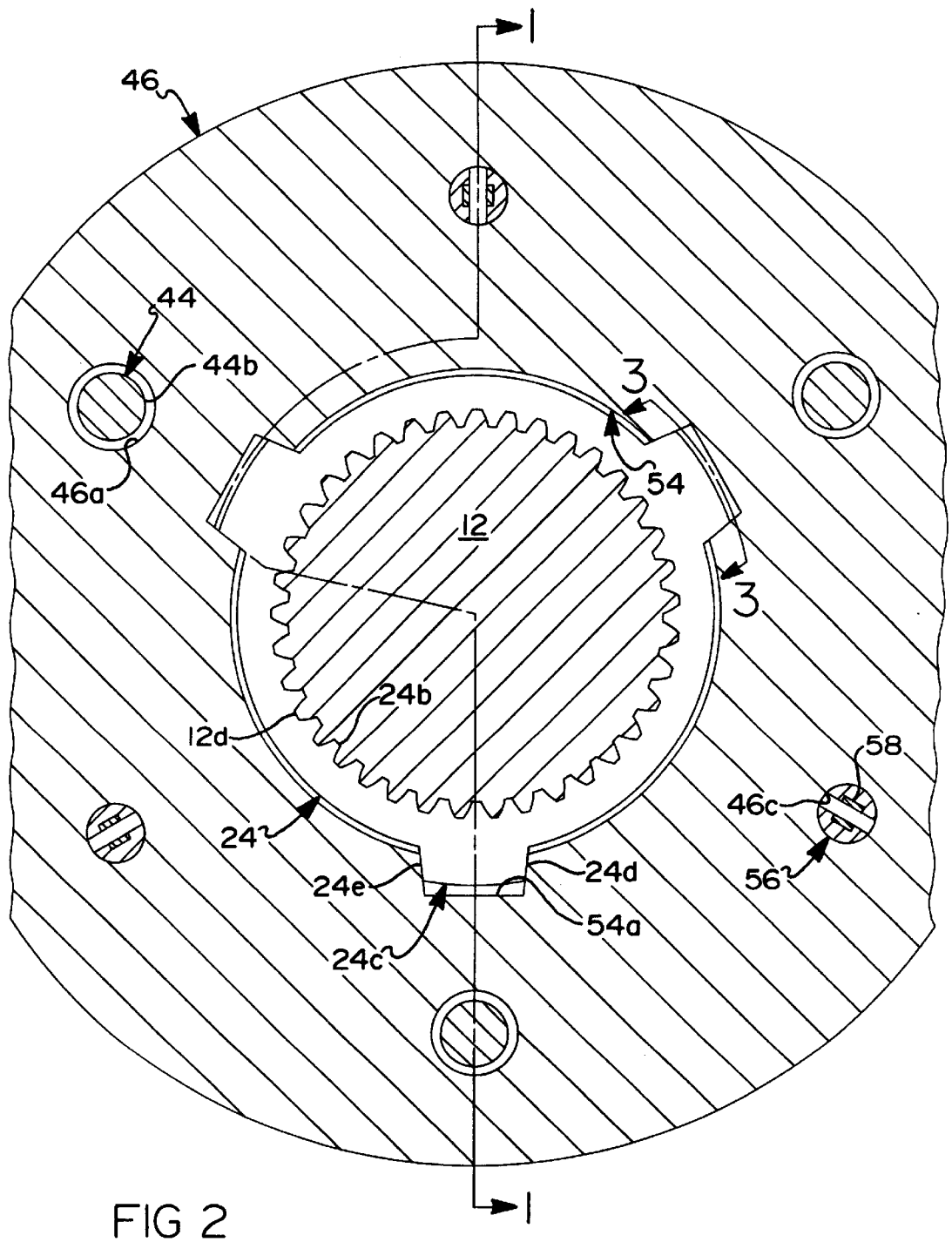
FIG. 2 is a partially broken away sectional view of the synchronizer looking along line 2—2 in FIG. 1.
Figure 7:
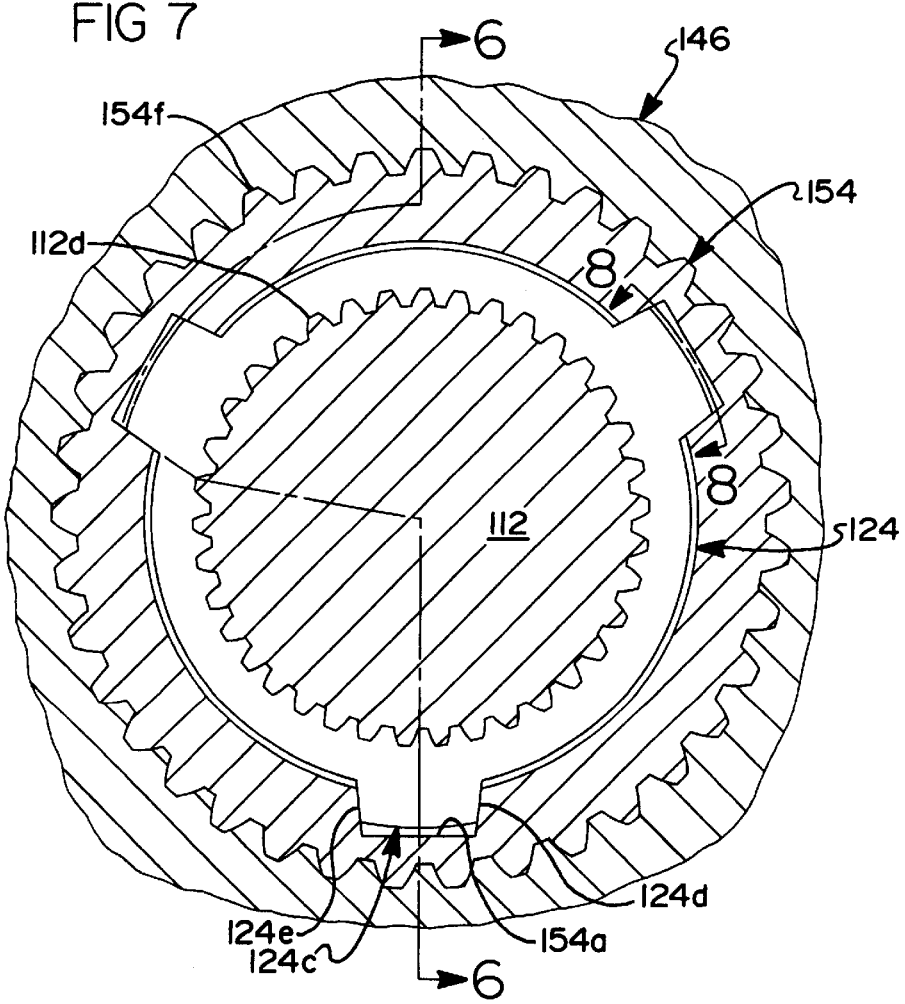
FIG. 7 is a partially broken away sectional view of the modified synchronizer looking along line 7—7 in FIG. 6.
Figure 8:
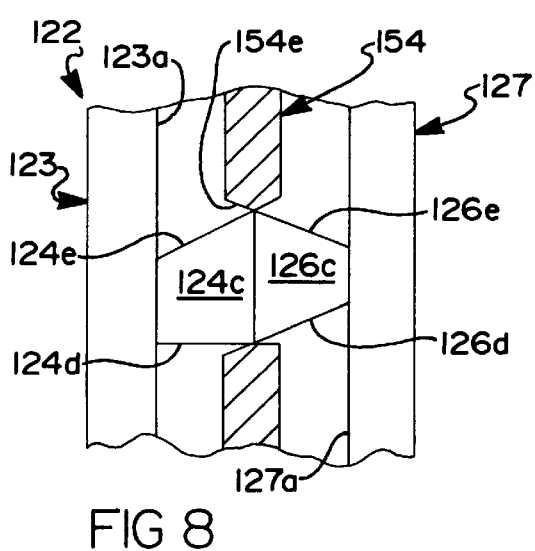
FIG. 8 is a partial and somewhat enlarged view of the synchronizer in section and looking along line 8—8 in FIG. 9.
Figure 9:
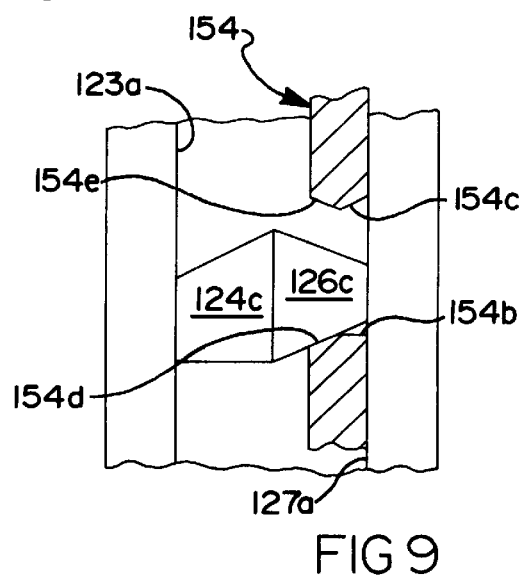
FIG. 9 illustrates an engaged position of self-energizing ramps in FIG. 8.

The term "synchronizer dutch mechanism", used herein, shall designate a clutch mechanism utilized to non-rotatably couple a selected ratio gear to a shaft by means of a positive/jaw clutch in which attempted engagement of the positive clutch is prevented until members of the positive clutch are brought to substantially synchronous rotation by a synchronizing friction clutch associated with the positive clutch. The term "self-energizing" shall designate a synchronizer clutch mechanism which includes ramps or cams or the like to increase the engaging force of the synchronizing clutch in relation to the synchronizing torque of the friction clutch.

Looking now at the drawings, therein is shown a gear assembly 10 in combination with a double acting synchronizer assembly 20. The gear assembly includes a shaft 12 to be mounted for rotation in a transmission about an axis 12a and axially spaced apart drives or gears 14, 16. The shaft 12 includes cylindrical surfaces 12b, 12c rotatably supporting the gears thereon via bearings 18.

The double-acting synchronizer 20 includes an annular hub 22 having an outer circumference greater in diameter than the diameters of the cylindrical surfaces. The hub includes two rings 24, 26 and has an axial length separating the gears via axially oppositely facing shoulders 24a, 26a which limit axial movement of the gears toward each other. Axial movement of the gears away from each other is limited by partially shown stops 28. Shaft splines 12d mate with ring internal splines 24b, 26b to prevent relative rotation therebetween. The rings 24, 26 include three radially outwardly projecting posts 24c, 26c defining self-energizing ramps 24d, 24e, 26d, 26e explained further hereinafter. Synchronizer 20 further includes friction members 30, 32 and jaw clutch members 34, 36 with external splines 34a, 36a integrally formed with gears 14,16, a single piece or unitary shift member 38, annular friction members 40, 42 rigidly secured together by three circumferentially spaced apart pins 44 extending axially from the friction members and through openings 46a in a flange 46, and three pre-energizer assemblies 48. Unitary shift member 38 includes the flange 46 extending radially outward from jaw clutch members 50, 52 and a ring 54 extending radially inward from the jaw clutch members 50, 52. The jaw clutch members 50, 52 include internal splines 50a, 52a that mate with the external splines 34a, 36a to provide positive rotational connections of shaft 12 with gears 14, 16 via ring 54 and hub 22 as explained further hereinafter.

The friction rings have cone friction surfaces 30a, 40a and 32a, 42a that engage for frictionally synchronizing the gears to the shaft prior to engagement of the jaw members. A wide range of cone angles may be used. Cone angles of seven and one-half degrees may be employed. The friction surfaces 40a, 42a and/or 30a, 32a may be defined by any of several known friction materials affixed to the friction members. Pyrolytic carbon friction materials, such as disclosed in U.S. Pat. Nos. 4,700,823; 4,844,218; and 4,778,548 may be used. These patents are incorporated herein by reference.

Pins 44 each include major diameter portions 44a having diameters slightly less than the diameter of flange openings 46a, a reduced diameter or groove portion 44b spaced between friction members 40, 42 (herein midway), and conical blocker shoulders or surfaces 44c extending radially outwardly from the pin axis and axially away from each other at angles relative to a plane normal to the pin axis. The grooved portions, when disposed within their respective flange openings, allow limited rotation of the rigid friction members 40, 42 and pins 44 relative to the flange to effect engagement of the pin blocker shoulders with chamfered blocker shoulders 46b defined about the flange openings 46a. The pins may be secured to friction members 40, 42 in any of several known manners.

The pre-energizer assemblies 48 may be any of several known types, herein they are of the split pin-type which are more completely shown and described in previously mentioned U.S. Pat. No. 5,339,936 which is incorporated herein by reference. Each pre-energizer assembly extends axially between the friction members 40, 42 and through openings 46c which are alternately spaced between openings 46a. Each pre-energizer assembly, includes two identical shells 56 having opposite ends 56a disposed in circumferentially spaced and axially opening recesses 40b, 42b in members 40, 42 and at least two identical leaf springs 58 sandwiched between and biasing the shells apart. The recesses 40b, 42b are elongated (not shown) in the circumferential direction of the friction rings and are of sufficient diameter in the radial direction of the friction rings to allow sliding movement of opposite ends 56a of the shells 56. Each pair of shells 56 has a major diameter less than the diameter of its associated opening 46c when squeezed together. As is known, ends 56a react against friction rings 40, 42 and chamfers 54c react against chamfers about openings 46c in flange 46 in response to initial engaging movement of flange 46, thereby effecting initial engagement of either friction clutch and initial synchronizing torque for rotating pins 44 relative to flange 46 and positioning the blocker shoulders for engagement.

Ring 54 includes radially inwardly opening recesses 54a receiving posts 24c, 26c of hub rings 24, 26. Each recess includes radially extending sides circumferentially facing each other and respectively defining self-energizing ramps 54b, 54c, 54d, 54e. During synchronization of gear 16 either ramps 54d react against ramps 26d or ramps 54e react against ramps 26e to provide an additive axial force ($F_a$) in the direction of gear 16. During synchronization of gear 14, either ramps 54b react against ramps 24d or ramps 54c react against ramps 24e. Ramp pair 54c, 24e provides an additive axial force ($F_a$) in the direction of gear 14. The surfaces of ramp pair 54b, 24d provide no additive or boost force since they are parallel to shaft axis 12a. As explained further hereinafter, the additive axial forces ($F_a$) sum with operator shift forces ($F_o$) applied to shift flange 46 to provide total force ($F_t$). The ramp surfaces allow limited rotation of unitary shift member 38 relative to shaft 12. When the ramps of ring 54 and posts 24c, 26c are engaged, they react synchronizing torque from the cone clutches to shaft 12 to provide the additive axial forces for increasing the engaging force of the cone clutches initially engaged by a shift force applied to flange 46, thereby increasing the synchronizing torque provided by the cone clutches. Herein, for example, gear 14 is a first or low speed gear and gear 16 is a second speed gear. In this example both ramp pairs associated with gear 16 provide increased synchronizing forces for up and down shifts while only one ramp pair associated with gear 14 provides increased synchronizing forces for downshifting. Further, the angles of the ramp surfaces may be varied to provide different amounts of additive axial force for up and down shifts and for high and low speed ratios. The magnitude or amount of the axial additive forces, as explained further hereinafter, is also a function of the mean radii ratio of friction clutches and self-energizing ramps. Accordingly, the magnitude of the additive forces for a given shift force applied to shift flange 46 by a shift fork may be varied by varying the ramp angles and/or the mean radii ratio.

When the flange 46 is in the neutral position of FIG. 1, reduced diameter portions 44b of pins 44 are aligned with their associated flange openings 46a, friction surfaces of the cone clutches are slightly spaced apart and are maintained in this spaced relation by chamfered or angled pre-energizer surfaces 56c of the pre-energizers 48 acting on pre-energizer chamfered surfaces about flange openings 46c by the force of springs 58. The axial force provided by the pre-energizer surfaces is preferably sufficient to prevent inadvertent engagement of the self-energizing ramps due to viscous shear of oil between the cone clutch surfaces. Alternatively or additionally, as shown in U.S. Pat. No. 5,092,439 incorporated herein by reference, inadvertent engagement may be prevented by flats at the intersections of the ramps of posts 24c, 26c and/or the ramps of ring 54. When it is desired to couple either gear to the shaft, an appropriate and unshown shift mechanism, such as disclosed in U.S. Pat. No. 4,920, 815 and incorporated herein by reference, is connected to the outer periphery of flange 46 in known manner for moving the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 46 in an axial direction and is represented by the length of arrow $F_o$ in FIG. 5.

Initial rightward axial movement of flange 46 by the operator shift force $F_o$ is transmitted to friction member 42 by pre-energizer surfaces 56c to effect initial frictional engagement of cone surface 42a with cone surface 32a. The initial engagement force on the cone surface is of course a function of the force of springs 58 and the angles of the pre-energizer surfaces. The initial frictional engagement (provided an asynchronous condition exists and momentarily ignoring the effect of the self-energizing ramps) produces an initial cone clutch engaging force and initial synchronizing torque which ensures limited relative rotation between flange 46 and the engaged friction member, and hence, movement of the reduced diameter pin portions 44b to the appropriate sides of the flange openings 46a to provide engagement of pin blocker shoulders 44c with the blocker shoulders 46b disposed about openings 46a. When the blocker shoulders are engaged, the full operator shift force $F_o$ on flange 46 is transmitted to friction member 42 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 5. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 46a to allow continued axial movement of the flange and engagement of the internal spline teeth of jaw member 52 with external spline teeth of jaw member 36 affixed to gear 16. The spline teeth may be configured as shown in U.S. Pat. Nos. 3,265,173 and 4,246,993 which are incorporated herein by reference.

Still ignoring the effects of the self-energizing ramps, cone clutch torque provided by the force $F_o$ is expressed by equation (1).

$$T_o = F_o R_c \mu_c / \sin\alpha \tag{1}$$

where:

$R_c$=the mean radius of the cone friction surface, $\mu_c$=the coefficient of friction of the cone friction surface, and $\alpha$=the angle of the cone friction surfaces.

Looking now at the affects of the self-energizing ramps and referring particularly to FIGS. 3 and 4, the synchronizing torque $T_o$, due to the operator applied axial shift force $F_o$, is of course transmitted to flange 46 by pins 44 and is reacted to shaft 12 across the self-energizing ramp surfaces. The self-energizing ramp surfaces, when engaged, produce the axial additive force $F_a$ acting on the flange in the same direction as shift force $F_o$. The forces sum to provide a total force $F_t$, thereby further increasing the engaging force of the cone clutch to provide an additive synchronizing torque $T_a$ which adds to the torque $T_o$ to provide a total torque $T_t$. FIG. 3 illustrates the position of the self-energizing ramp surfaces while shift flange 46 is in the neutral position corresponding to the position of FIG. 1. FIG. 4 illustrates a position of the ramps while gear 16 is being synchronized by engaged cone surfaces 32a, 42a. The engaged cone surfaces are producing a synchronizing torque in a direction which has effected engagement of flange ramp surfaces 54d with hub ramp surfaces 24d affixed to shaft 12. Hence, the sum of the axial forces for engaging the cone clutch are $F_o$ plus $F_a$ and the sum of the synchronizing torques being produced by the cone clutch are $T_o$ plus $T_a$, as graphically shown in FIG. 5. For a given operator shift force $F_o$ and an operator synchronizing torque $T_o$, the magnitude of the axial additive force is preferably a function of the angles of the engaged self-energizing ramp surfaces. These angles are preferably great enough to produce an additive force $F_a$ of magnitude sufficient to significantly increase synchronizing torque and decrease synchronizing time in response to a given moderate shift effort by the operator. However, these angles are also preferably low enough to produce a controlled axial additive force $F_a$, i.e., the force $F_a$ should increase or decrease in response to the force $F_o$ increasing or decreasing. If the ramp angles are too great, the ramps are self-locking rather than self-energizing; hence, once initial engagement of the cone clutch is effected the force $F_a$ will rapidly and uncontrollably increase independent of the force $F_o$, thereby driving the cone clutch toward uncontrolled lockup. Self-locking rather than self-energizing decreases shift quality or shift feel, may over stress synchronizer components, may cause over heating and rapid wear of the cone clutch surfaces, and may even override operator movement of the shift lever. Where synchronization is reached, the blocker shoulders move out of engagement and the spline teeth of jaw member 52 move rightward into engagement with the spline teeth of jaw member 36 until ring 54 contacts stops 26f extending from posts 26c. The self-energizing ramp surfaces have a length in the axial direction sufficient to remain engaged after synchronization is reached and after full engagement of jaw teeth 52a and 36a. Also, since the self-energizing ramp means remain engaged during engagement of the jaw teeth, they continue to provide a stay engaged force in the direction of the additive force for maintaining engagement of the engaged jaw teeth. Synchronization of gear 14 is done in an analogous manner and leftward movement of jaw member 50 is limited by a stop 24f extending from posts 24c.

The main variables and equations for calculating self-energizing ramp angles may be seen by reference to previously mentioned U.S. Pat. No. 5,092,439.

FIGS. 6–9 illustrate a partially shown gear assembly 110 in combination with a modified double acting synchronizer assembly 120 that differs from assembly 20 in FIGS. 1–4 mainly by the use of springs to control/limit the magnitude of the additive force $F_a$. For brevity some of the FIG. 1 and 2 components are cut away or not shown in FIGS. 6 and 7; these components are substantially the as in FIGS. 1 and 2. Assembly 110 includes a shaft 112 having an axis 112a and partially shown drive gears 114, 116. Shaft 112 includes cylindrical surfaces 112b, 112c rotatably supporting the gears thereon via bearings 118.

The double-acting synchronizer 120 includes an annular hub 122 having an outer circumference greater in diameter than the diameters of the cylindrical surfaces.

The hub includes four rings 123, 124, 126, 127 and has an axial length separating the gears in a manner analogous to FIG. 1. Axial movement of the gears away from each other is limited as in FIG. 1. Shaft splines 112b mate with internal splines of the rings to prevent relative rotation therebetween. The rings 124, 126 include three radially outwardly projecting posts 124c, 126c defining self-energizing ramps 124d, 124e, 126d, 126e explained further hereinafter. Synchronizer 120 further includes jaw clutch members 134,136 with external splines 134a, 136a integrally formed with gears 114,116 and a single piece or unitary shift member 138. Unitary shift member 138 includes a partially shown flange 146 extending radially outward from jaw clutch members 150,152 and a ring 154 not integral with the jaw clutch members as in FIG. 1. The jaw clutch members 150,152 include internal splines 150a, 152a that mate with the external splines 134a, 136a to provide positive rotational connections of shaft 112 with gears 114, 116 via ring 154 and hub 122 as explained further hereinafter. Spline teeth 150a, 152a meet to provide splines which slidably mate with external splines 154f on ring 154. Ring 154 is biased axially in opposite directions by springs 155. The springs react against retainers 157 in annular recesses in splines 150a, 152a.

Ring 154 includes radially inwardly opening recesses 154a receiving posts 124c, 126c of hub rings 124, 126. Each recess includes radially extending sides circumferentially facing each other and respectively defining self-energizing ramps 154b, 154c, 154d, 154e. During synchronization of gear 114 or 116 the ramps of ring 154 react against ramps of posts 124c or 126c as in FIGS. 1–5 to provide the additive axial force ($F_a$) in the direction of the gear being synchronized. However, the additive axial force ($F_a$) is now being transmitted to the flange 146 by springs 155 and is limited to the maximum compressed force of the springs when axially facing sides of ring 154 contact axially facing sides 123a, 127a of rings 123, 127.

Two embodiments of a pin-type synchronizer have been disclosed. The following claims are intended to cover inventive portions of the disclosed sychronizer and variations and modifications believed to be within the spirit of the invention.

What is claimed is:

1. A pin-type synchronizer selectively operative to frictionally synchronize and positively connect either of first and second drives to a shaft having an axis; the synchronizer including:

first and second jaw members affixed respectively to the first and second drives and respectively engagable with axially movable third and fourth jaw members in response to an axial bidirectional shift force ($F_o$) moving a radially extending flange;

first and second friction members respectively secured for rotation with the first and second drives and third and fourth friction members concentric to the shaft and axially movable between the drives for frictional engagement respectively with the first and second friction members to provide a synchronizing torque for synchronizing the drives with the shaft;

blocker means operative when engaged for preventing engagement of the jaw members prior to the synchronizing, the blocker means including a plurality of circumferentially spaced apart pins rigidly extending axially between the third and fourth friction members and into a set of openings in the flange, each of the pins having a blocker shoulder engagable with a blocker shoulder defined about the associated opening;

pluralities of first and second self-energizing ramps means respectively engagable in response to the synchronizing torque for producing an additive force ($F_a$) on the flange in the direction of the shift force ($F_o$) for increasing total engaging force on the friction members, the first self-energizing ramp means affixed against rotational movement relative to the flange and the second self-energizing ramp means affixed against rotational and axial movement relative to the shaft; the improvement comprising:

the first and second self-energizing ramp means disposed radially inward of the third and fourth jaw members; and stop means engage to limit axial movement of the third and fourth jaw members during engagement respectively with the first and second jaw members and during engagement of the first and second self-energizing ramp means, whereby the engaged self-energizing ramp means provide a stay engaged force for maintaining engagement of the engaged jaw members.

2. The synchronizer of claim 1, wherein:

the third and fourth jaw members are defined by a single member integral with a boost ring extending radially inward therefrom and including the first self-energizing ramp means.

3. The synchronizer of claim 2, wherein:

the radially extending flange is integral with the single member and extends radially outward therefrom.

4. The synchronizer of claim 2, wherein:

the second ramp means project radially outward from an annular hub axially disposed between the drives and affixed to the shaft.

5. The synchronizer of claim 4, wherein:

the ring includes a plurality of radially inward opening recesses each receiving one of the second self-energizing ramp means, each recess having circumferentially facing sides each defining at least one ramp of the first self-energizing ramp means.

6. The synchronizer of claim 5, wherein:

the annular hub is defined by first and second hub rings each defining at least one ramp of the second ramp means.

7. The synchronizer of claim 6, wherein:

the radially extending flange is integral with the single member and extends radially outward therefrom.

8. The synchronizer of claim 3, wherein:

the second ramp means project radially outward from an annular hub axially disposed between the drives and affixed to the shaft.

9. The synchronizer of claim 8, wherein:

the ring includes a plurality of radially inward opening recesses each receiving one of the second self-energizing ramp means, each recess having circumferentially facing sides each defining at least one ramp of the first self-energizing ramp means.

10. The synchronizer of claim 9, wherein:

the annular hub is defined by first and second first and second hub rings each defining at least one ramp of the second ramp means.

11. The synchronizer of claim 1, wherein:

the third and fourth jaw members are defined by a single member having internal splines slidably receiving external splines on a boost ring defining the first self-energizing ramp means, the ring biased axially in opposite directions by first and second springs, the springs for limiting the magnitude of the additive force on the flange to the amount of force on at least one of the springs when the stop means engage.

12. The synchronizer of claim 11, wherein:
the radially extending flange is integral with the single member and extends radially outward therefrom.

13. The synchronizer of claim 11, wherein:
the second ramp means project radially outward from an annular hub axially disposed between the drives and affixed to the shaft.

14. The synchronizer of claim 13, wherein:
the ring includes a plurality of radially inward opening recesses each receiving one of the second self-energizing ramp means, each recess having circumferentially facing sides each defining at least one ramp of the first self-energizing ramp means.

15. The synchronizer of claim 14, wherein:
the annular hub is defined by first and second first and second hub rings each defining at least one ramp of the second ramp means.

16. The synchronizer of claim 15, wherein:
the radially extending flange is integral with the single member and extends radially outward therefrom.

17. The synchronizer of claim 12, wherein:
the second ramp means project radially outward from an annular hub axially disposed between the drives and affixed to the shaft.

18. The synchronizer of claim 17, wherein:
the ring includes a plurality of radially inward opening recesses each receiving one of the second self-energizing ramp means, each recess having circumferentially facing sides each defining at least one ramp of the first self-energizing ramp means.

19. The synchronizer of claim 18, wherein:
the annular hub is defined by first and second first and second hub rings each defining at least one ramp of the second ramp means.

20. A pin-type synchronizer selectively operative to frictionally synchronize and positively connect either of first and second drives to a shaft having an axis; the synchronizer including:
first and second jaw members affixed respectively to the first and second drives and respectively engagable with axially movable third and fourth jaw members in response to an axial bidirectional shift force ($F_o$) moving a radially extending flange;
first and second friction members respectively secured for rotation with the first and second drives and third and fourth friction members concentric to the shaft and axially movable between the drives for frictional engagement respectively with the first and second friction members to provide a synchronizing torque for synchronizing the drives with the shaft;
blocker means operative when engaged for preventing engagement of the jaw members prior to the synchronizing, the blocker means including a plurality of circumferentially spaced apart pins rigidly extending axially between the third and forth friction members and into a set of openings in the flange, each of the pins having a blocker shoulder engagable with a blocker shoulder defined about the associated opening;
pluralities of first and second self-energizing ramps means respectively engagable in response to the synchronizing torque for producing an additive force ($F_a$) on the flange in the direction of the shift force ($F_o$) for increasing total engaging force on the friction members, the first self-energizing ramp means affixed against rotational movement relative to the flange and the second self-energizing ramp means affixed against rotational and axial movement relative to the shaft; the improvement comprising:
the first and second self-energizing ramp means disposed radially inward of the third and fourth jaw members; and
stop means engage to limit axial movement of the third and fourth jaw members during engagement respectively with the first and second jaw members and during engagement of the first and second self-energizing ramp means, the first and second self-energizing ramp means having a length in the axial direction sufficient to remain engaged after the synchronization is reached and after full engagement of the third and fourth jaw members respectively with the first and second jaw members, said self-energizing ramp means providing a stay engaged force for maintaining engagement of the jaw members.

21. A pin-type synchronizer selectively operative to frictionally synchronize and positively connect either of first and second drives to a shaft having an axis; the synchronizer including:
first and second jaw members affixed respectively to the first and second drives and respectively engagable with axially movable third and fourth jaw members in response to an axial bidirectional shift force ($F_o$) moving a radially extending flange, the flange and the third and fourth jaw members rigidly secured together and mounted for limited rotation relative to the shaft;
first and second friction members respectively secured for rotation with the first and second drives and third and fourth friction members concentric to the shaft and axially movable between the drives for frictional engagement respectively with the first and second friction members to provide a synchronizing torque for synchronizing the drives with the shaft;
blocker means operative when engaged for preventing engagement of the jaw members prior to the synchronizing, the blocker means including a plurality of circumferentially spaced apart pins rigidly extending axially between the third and forth friction members and into a set of openings in the flange, each of the pins having a blocker shoulder engagable with a blocker shoulder defined about the associated opening;
pluralities of first and second self-energizing ramps means respectively engagable in response to the synchronizing torque for producing an additive force ($F_a$) on the flange in the direction of the shift force ($F_o$) for increasing total engaging force on the friction members, the first self-energizing ramp means affixed against rotational movement relative to the flange and the third and fourth jaw members, the second self-energizing ramp means affixed against rotational and axial movement relative to the shaft, and the first and second self-energizing ramp means remain engaged during engagement of the third and fourth jaw members respectively with the first and second jaw members, said self-energizing ramp means providing a stay engaged force for maintaining engagement of the jaw members.

22. The synchronizer of claim 21, wherein:
a boost ring extending radially inward from the third and fourth jaw members and including a plurality of radially inward opening recesses each receiving one of the second self-energizing ramp means, each recess having circumferentially facing sides each defining at least one ramp of the first self-energizing ramp means.

23. The synchronizer of claim 22, wherein:

the second ramp means project radially outward from an annular hub axially disposed between the drives and affixed to the shaft.

24. The synchronizer of claim 23, wherein:

the annular hub is defined by first and second hub rings each defining at least one ramp of the second ramp means.

25. The synchronizer of claim 20, wherein:

the third and fourth jaw members having internal splines slidably receiving external splines on a boost ring defining the first self-energizing ramp means, the ring biased axially in opposite directions by first and second springs, the springs for limiting the magnitude of the additive force on the flange.

26. The synchronizer of claim 25, wherein:

the second ramp means project radially outward from an annular hub axially disposed between the drives and affixed to the shaft; and the boost ring includes a plurality of radially inward opening recesses each receiving one of the second self-energizing ramp means, each recess having circumferentially facing sides each defining at least one ramp of the first self-energizing ramp means.

27. The synchronizer of claim 26, wherein:

the annular hub is defined by first and second hub rings each defining at least one ramp of the second ramp means.

* * * * *